United States Patent [19]

Tanabe

[11] Patent Number: 4,844,570

[45] Date of Patent: Jul. 4, 1989

[54] PLUG OF FIBER OPTIC CABLE CONNECTOR

[75] Inventor: Takashi Tanabe, Tokyo, Japan

[73] Assignee: NEC Corporation, Japan

[21] Appl. No.: 193,797

[22] Filed: May 13, 1988

[30] Foreign Application Priority Data

May 15, 1987 [JP] Japan ............................ 62-118145

[51] Int. Cl.$^4$ .......................... G02B 6/36; G02B 7/26
[52] U.S. Cl. .................... 350/96.20; 350/96.21
[58] Field of Search ................ 350/96.20, 96.21, 96.22

[56] References Cited

U.S. PATENT DOCUMENTS

| | | | |
|---|---|---|---|
| 4,190,317 | 2/1980 | Makuch | 350/96.20 |
| 4,711,519 | 12/1987 | Smulders | 350/96.20 |
| 4,744,621 | 5/1988 | Tanabe et al. | 350/96.20 |
| 4,744,628 | 5/1988 | Winter | 350/96.21 |
| 4,762,395 | 8/1988 | Gordon et al. | 350/96.20 |
| 4,776,663 | 10/1988 | Malinge et al. | 350/96.20 |
| 4,787,706 | 11/1988 | Cannon et al. | 350/96.20 |
| 4,789,216 | 12/1988 | Schvott | 350/96.20 |
| 4,798,440 | 1/1989 | Hoffer et al. | 350/96.20 |

OTHER PUBLICATIONS

Siemen's Catalog, "Fiber Optic Components Reliable Partners of Electronics".

*Primary Examiner*—William L. Sikes
*Assistant Examiner*—Robert E. Wise
*Attorney, Agent, or Firm*—Leydig, Voit & Mayer

[57] ABSTRACT

A plug of a fiber optic cable connector according to this invention includes first and second cylindrical members each with a bottom so as to reciprocate at a predetermined stroke along a ferrule. Leaf springs each having a surface ascending in the circumferential direction and projections for urging the leaf springs are arranged between the first and second cylindrical members. When the ferrule abuts against an optical device, the first and second cylindrical members are not rotated together and only the first cylindrical member is rotated, thereby detecting a connecting state of optical fibers.

6 Claims, 10 Drawing Sheets

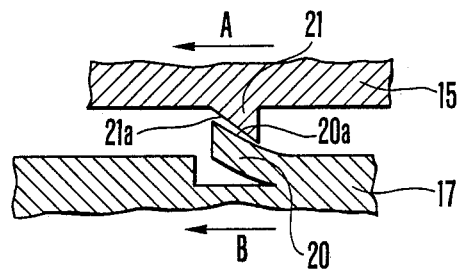
F I G. 6A
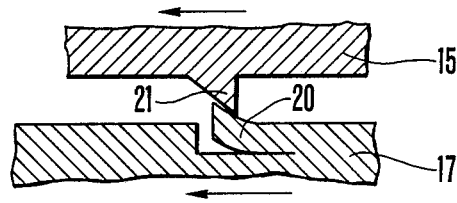
F I G. 6B
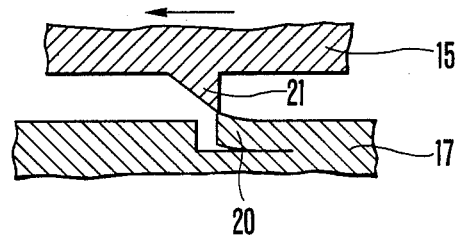
F I G. 6C
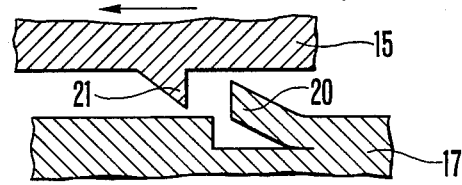
F I G. 6D
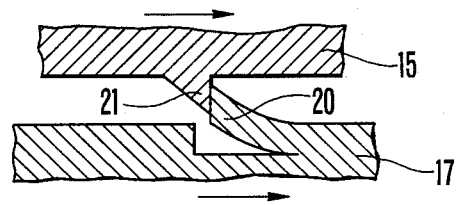
F I G. 6E

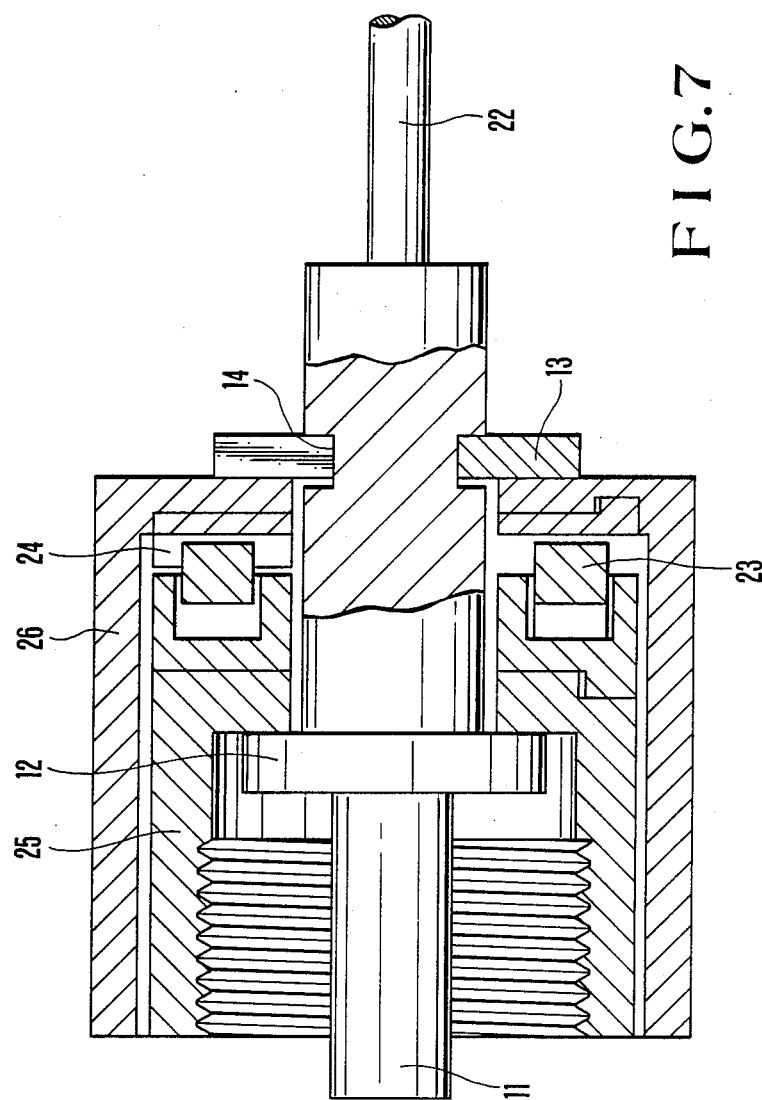

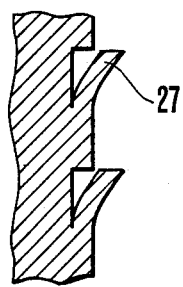 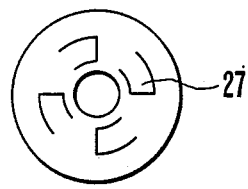
FIG.8A    FIG.8B
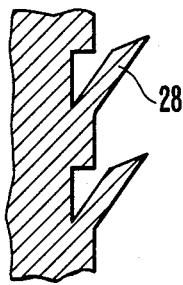 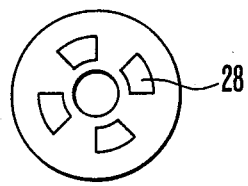
FIG.9A    FIG.9B
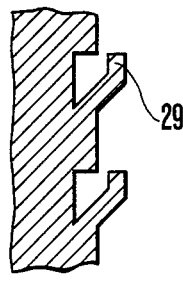 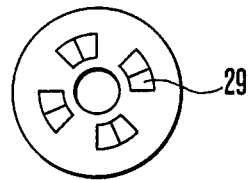
FIG.10A    FIG.10B

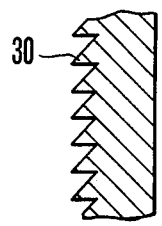 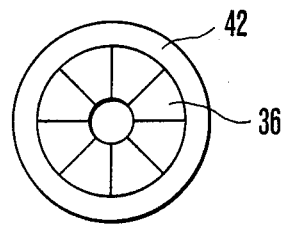
FIG.11A  FIG.11B
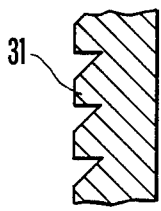 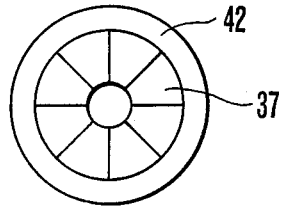
FIG.12A  FIG.12B
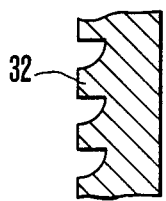 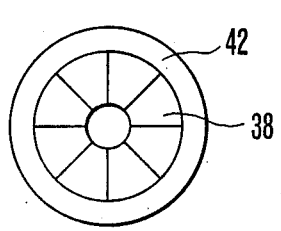
FIG.13A  FIG.13B
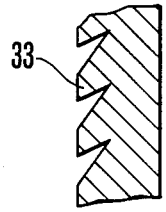 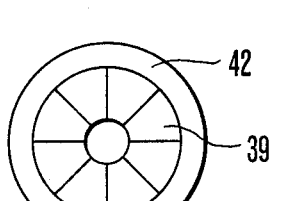
FIG.14A  FIG.14B

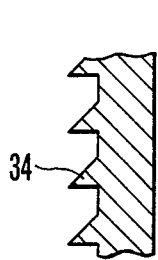 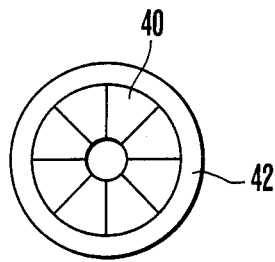
FIG.15A  FIG.15B
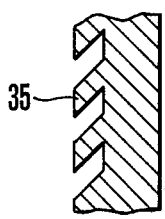 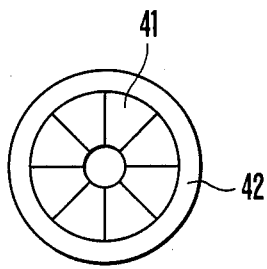
FIG.16A  FIG.16B
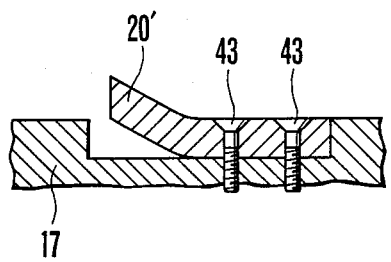
FIG.17

PLUG OF FIBER OPTIC CABLE CONNECTOR

BACKGROUND OF THE INVENTION

The present invention relates to a plug of a fiber optic cable connector used in optical communication equipment.

A conventional plug of a fiber optic cable connector is arranged, as shown in FIG. 1 (see PZN47255 described in Siemens' catalog "Fiber Optic Components Reliable Partners of Electronics", and U.S. Pat. No. No. 4,190,317). Referring to FIG. 1, reference numeral 1 denotes a cylindrical locking nut; and 2, a ferrule or pin fixed inside the nut 1.

In order to connect a fiber optic cable having a distal end with a plug of a structure shown in FIG. 1, the ferrule 2 of each plug is inserted into an adapter (not shown) or receptacle (not shown) such that end faces of optical fibers (not shown) abut against each other. Threads formed on the inner surface of the locking nut 1 are mated with those formed on the outer surface of the adapter, and the locking nut 1 is rotated.

In a conventional plug of a fiber optic connector, when two plugs are inserted from both ends of an adapter to connect the optical fibers inside the plugs, the rotating degree of the locking nut 1 of the plug is not accurately determined with respect to the adapter. The locking nut 1 is often excessively rotated to cause the locking nut 1 to generate an excessive rotational torque between end faces of the ferrules 2 upon connection of the optical fibers. As a result, the ferrule 2 collides against the adapter and the end face of the optical fiber fixed on an axis of the ferrule are damaged to degrade fiber connecting reliability.

SUMMARY OF THE INVENTION

It is an object of the present invention to eliminate the conventional drawback described above and to provide a plug of a fiber optic cable connector, wherein damage to the ferrule upon abutment against the adapter can be prevented and connection reliability of optical fibers can be therefore improved.

In order to achieve the above object of the present invention, there is provided a plug of a fiber optic cable connector comprising: a first cylindrical member with a bottom, the first cylindrical member being reciprocated at a predetermined stroke along a ferrule extending in an axial direction, a second cylindrical member with a bottom, the second cylindrical member being reciprocated inside the first cylindrical member and being provided with a hole for receiving the ferrule and device connecting threads, leaf springs each having a surface ascending in a circumferential direction between a bottom portion of the second cylindrical portion and a bottom portion of the first cylindrical portion, and projections for urging the leaf springs, respectively.

BRIEF DESCRIPTION OF THE DRAWINGS

FIGS. 6A, 6B, 6C, 6D, and 6E are sectional views for explaining the operation of the plug of the present invention;

FIG. 7 is a sectional view showing a plug for a fiber optic cable connector according to another embodiment of the present invention;

FIGS. 8A, 9A and 10A and Fibs. 8B, 9B, and 10B are respectively sectional views and plan views showing leaf springs according to other embodiments of the present invention;

FIGS. 11A, 12A, 13A, 14A, 15A, and 16A and FIGS. 11B, 12B, 13B, 14B, 15B, and 16B are respectively sectional views and plan views showing projections according to other embodiments of the present invention; and FIG. 17 is a sectional view showing a leaf spring according to still another embodiment of the present invention.

DETAILED DESCRIPTION OF THE PREFERRED EMBODIMENTS

Preferred embodiments of the present invention will be described in detail with reference to the accompanying drawings.

Figure 1:
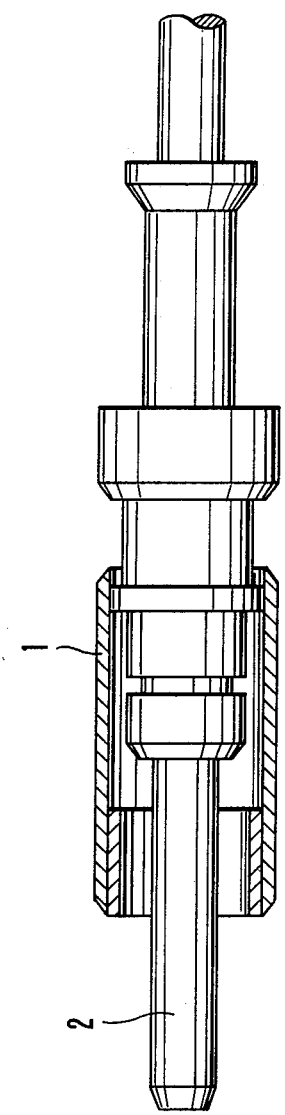
FIG. 1 is a sectional view showing a conventional plug of a fiber optic cable connector.
Figure 2:
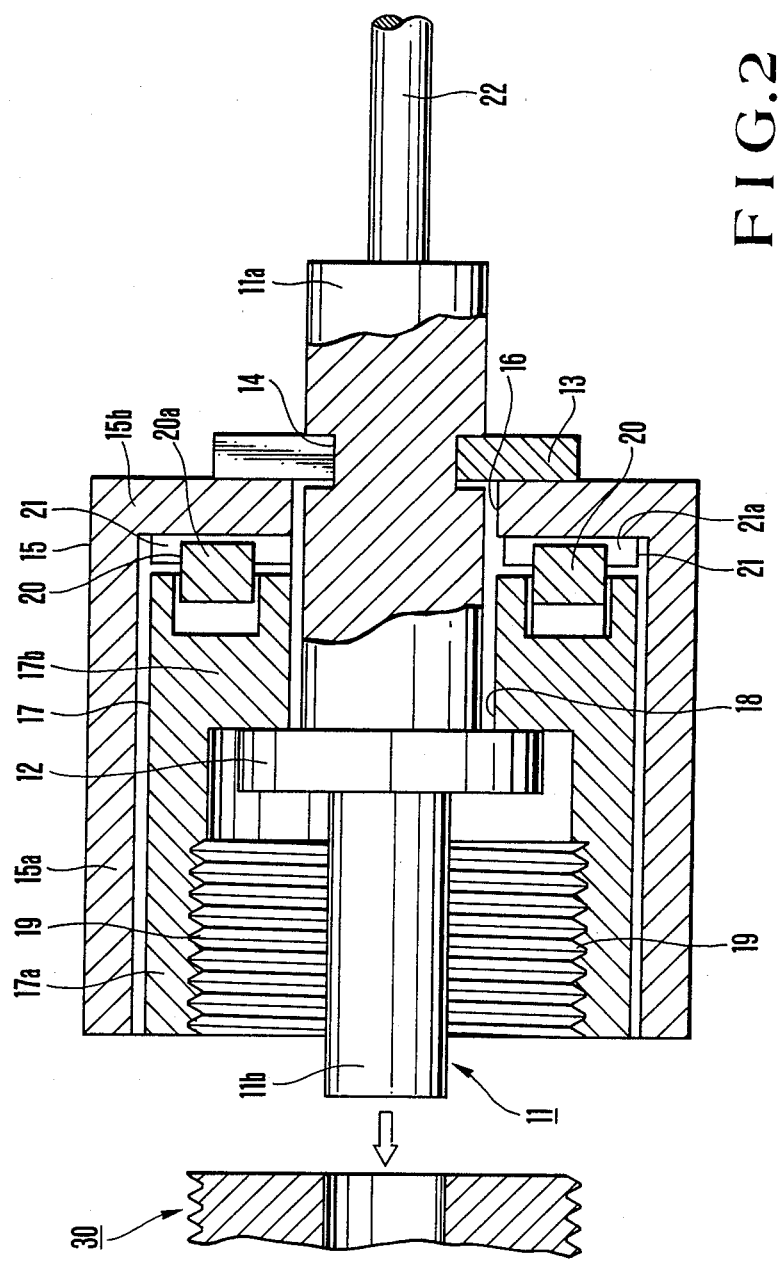
FIG. 2 is a sectional view showing a plug of a fiber optic cable connector according to an embodiment of the present invention.
Figure 3:
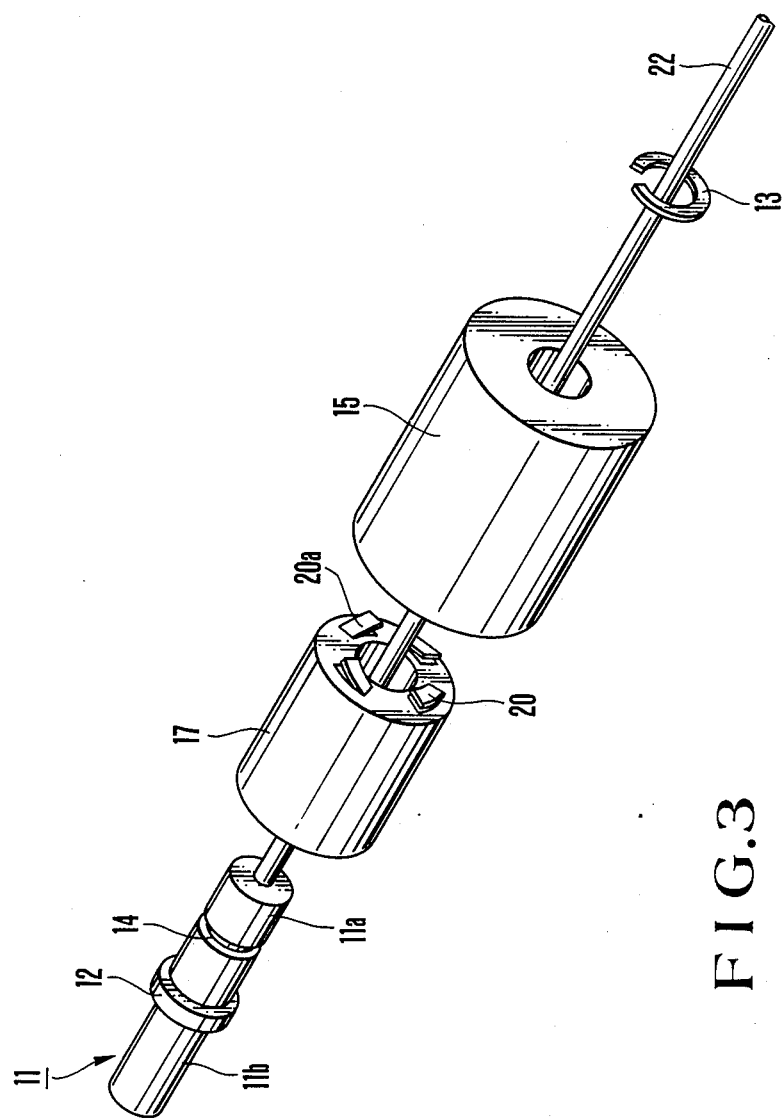
FIGS. 3 and 4 are exploded perspective views of the plug shown in FIG. 2.
Figure 4:
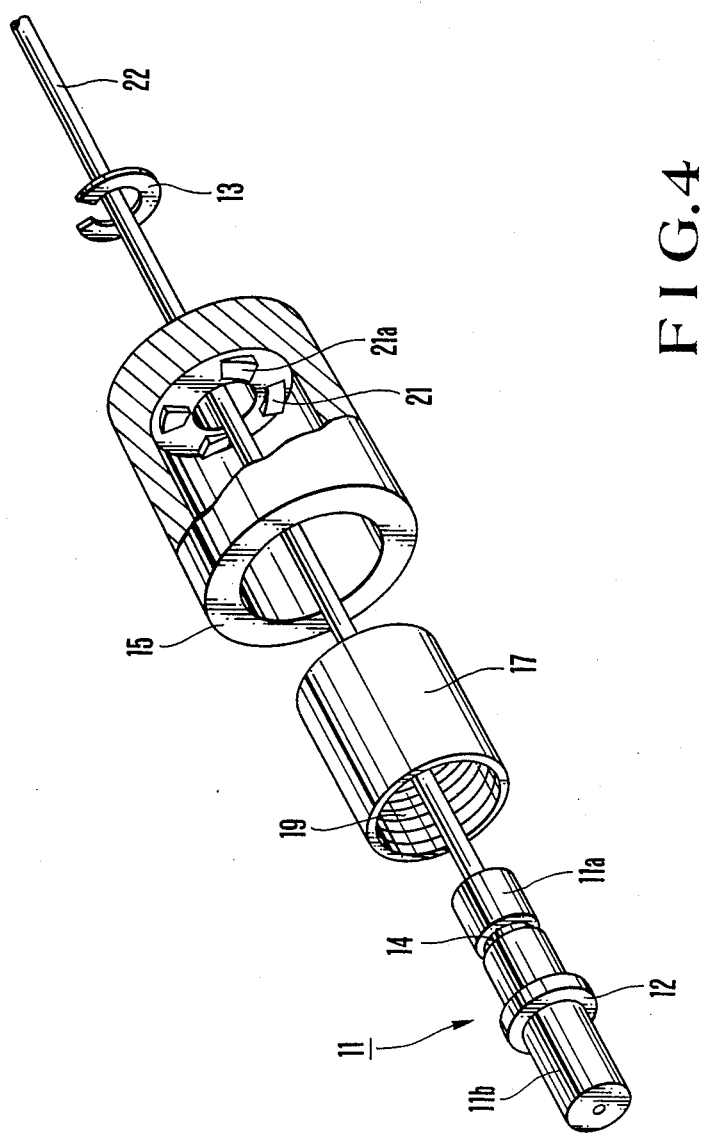

FIG. 2 is a sectional view showing a sectional view of a plug of a fiber optic cable connector according to the present invention and FIGS. 3 and 4 are respectively exploded perspective views thereof. Referring to FIGS. 2, 3, and 4, a ferrule 11 comprises a cylindrical member 11a to be inserted in an adapter 30 as will be described later, a cylindrical member 11b having an outer diameter larger than that of the cylindrical member 11a, and a flange 12 for coupling the cylindrical members 11a and 11b such that the cylindrical members 11a and 11b are coaxial with each other. The flange 12 has an outer diameter larger than that of the large-diameter cylindrical member 11b. An annular groove 14 is formed in the outer surface of the cylindrical member 11a so as to be engaged with a snap ring 13. An optical fiber 22 is inserted and fixed in the ferrule 11 so as to correspond to its axis.

A cup-shaped member 15 comprises a tube portion 15a coaxial with the ferrule 11 and a bottom portion 15b located at a position opposite to the adapter 30 side. The adapter 30 side of the cup-shaped member 15 is open. A hole 16 is formed at the central portion of the member 15 to receive the member 11a of the ferrule 11. The member 15 can be rotated about the ferrule 11 and is movable along the axial direction of the ferrule 11. A plurality of saw-toothed projections 21 each having an inclined curved surface 21a are formed at predetermined angular intervals (to be described later) on the inner wall surface of the bottom portion 15b of the member 15.

A cup-shaped member 17 comprises a tube portion 17a coaxial with the tube portion 15a and having an outer diameter slightly smaller than an inner diameter of the tube portion 15a and a bottom portion 17b located on the same side as that of the bottom portion 15b of the member 15. The adapter 30 side of the cup-shaped member 17 is open. A hole 18 is formed at the central portion of the bottom portion 17b of the member 17 to receive the member 11a of the ferrule 11. Therefore, the member 17 can be rotated about the ferrule 11 and is movable along the axial direction of the ferrule 11.

Threads 19 are formed on the inner surface of the distal end portion of the tube portion 17a of the member 17 on the adapter 30 side and can be mated with those of the adapter 30.

A plurality of leaf springs 20 each having a curved surface 20a ascending in the clockwise direction are formed on the outer side of the bottom portion 17b of the member 17. These leaf springs 20 are formed by partially punching the bottom surface of the member 17 and bending the cut portions outward.

The maximum height of each leaf spring 20 from the surface of the member 17 is set to be almost equal to a height of the corresponding projection 21 of the member 15.

A distance between the flange 12 of the ferrule 11 and the snap ring 13 is set to be almost equal to a sum of a total thickness of the bottom portion 15b of the member 15 and the bottom portion 17b of the member 17 and the height of each projection.

The operation of the plug shown in FIGS. 2 to 4 will be described below.

Figure 5:
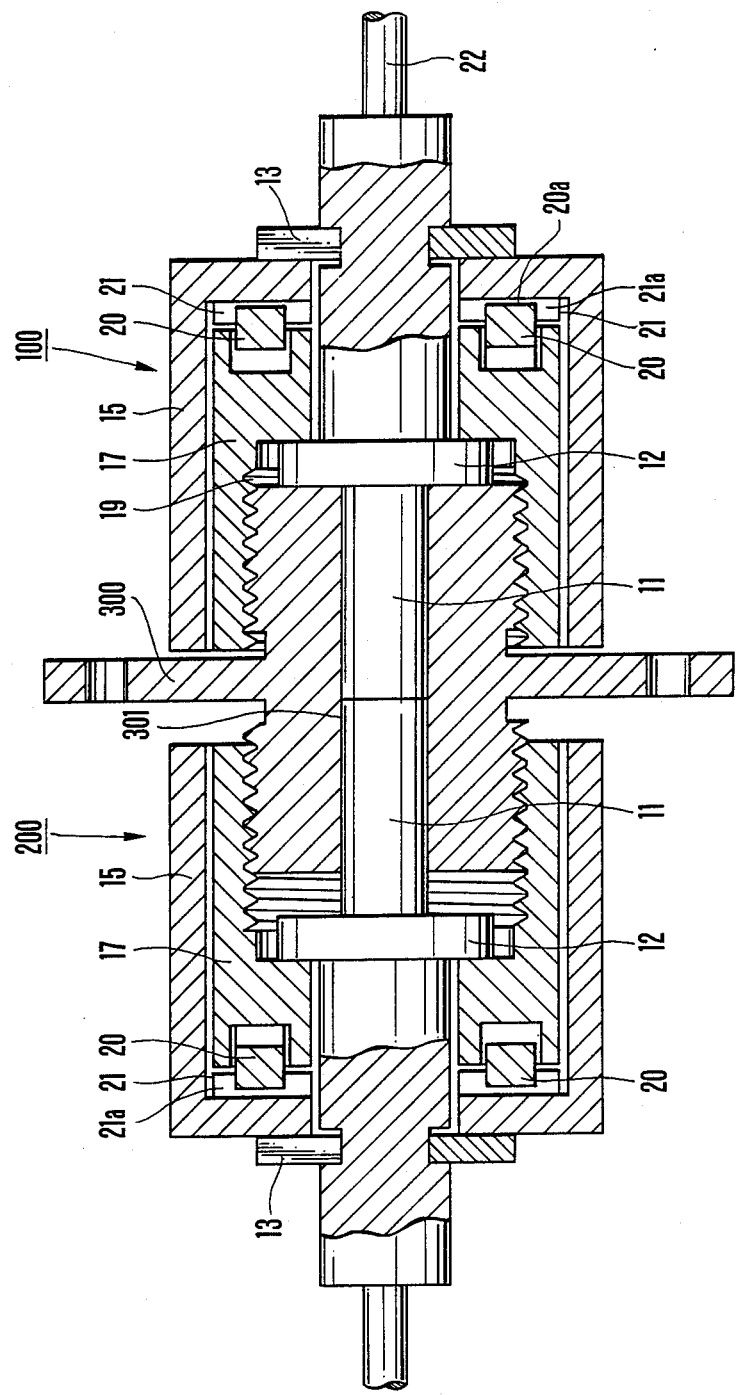
FIG. 5 is a sectional view for explaining use of the plug shown in FIG. 2.

FIG. 5 shows a state wherein plugs 100 and 200 having the same structure as in FIG. 2 are inserted from both ends of an adapter 300 and are connected to each other. The ferrule 11 of the plug 100 is inserted in a hollow portion 301 in the adapter 300, and the member 15 is rotated clockwise. Since no resistance acts on the member 17 until the flange 12 abuts against the distal end of the adapter 300, the member 17 is rotated together with the member 15 by a force of the projections 21 pressing the corresponding leaf springs 20. The threads 19 are engaged with those of the adapter 300 so that the plug 100 is moved forward, as shown in FIG. 6A. However, when the flange 12 abuts against the distal end of the adapter 300, the member 17 is no longer moved forward. When the member 15 is further rotated, the projections 21 are moved beyond the distal ends of the leaf springs 20 as shown in FIGS. 6C and 6D while urging the corresponding leaf springs 20 as shown in FIG. 6B. As shown in FIG. 6D, when the projections 21 are disengaged from the leaf springs 20, rotation of the member 15 is no longer transmitted to the member 17. Therefore, only the member 15 is rotated.

Subsequenlty, the ferrule 11 of the plug 200 is inserted into the hollow portion 301 of the adapter 300, and the member 15 is rotated to move the plug 200 in the forward direction or adapter direction (to the right direction in FIG. 5) since no obstacle is present in the moving path. When the distal end of the ferrule 11 of the plug 200 abuts against the distal end of the ferrule 11 of the plug 100, a resistive force acts on rotation of the member 17. As shown in FIGS. 6B to 6D, when the member 15 is further rotated, the projections 21 are disengaged from the leaf springs 20. The rotational force of the member 15 of the plug 200 is not transmitted to the member 17. In this state, only the member 15 is rotated. Therefore, an excessive force does not act on the distal end faces of both the ferrules 11.

In order to disengage the plugs 100 and 200 from the adapter 300, the members 15 are rotated counterclockwise. As shown in FIG. 6E, the members 17 are rotated upon rotation of the members 15 when the projections 21 press only the leaf springs 20.

FIG. 7 shows a plug according to another embodiment of the present invention. The same reference numerals as in FIG. 2 denote the same parts in FIG. 7. Cup-shaped members 25 and 26 correspond to the members 17 and 15 of FIG. 2, respectively, and a detailed description thereof will be omitted.

Referring to FIG. 7, leaf springs 23 and projections 24 are not respectively integrally formed with the bottoms of the member 25 and 26 but are mounted on the members 25 and 26 by a rotation preventive key (not shown).

FIGS. 8A, 9A, and 10A and FIGS. 8B, 9B, and 10B are respectively sectional views and plan views of leaf springs according to other embodiments of the present invention. As shown in these figures, leaf springs 27, 28, and 29 having the inclined surfaces can be used to obtain the same effect as in the embodiment of FIG. 2.

FIGS. 11A, 12A, 13A, 14A, 15A, and 16A and FIGS. 11B, 12B, 13B, 14B, 15B, and 16B are respectively sectional views and plan views showing projections. Projections 30 to 35 having cross sections shown in these figures can be used to obtain the same effect as in the projections 21. A large number of projection members 36 to 41 having the projections 30 to 35 are radially arranged on the inner bottom surfaces of the members each corresponding to the member 15 of FIG. 2.

According to the present invention as described above, the leaf springs each having an ascending surface in the circumferential direction are formed in the bottom portion of one of the two coaxially fitted cup-shaped members to be reciprocated with a predetermined stroke in the longitudinal direction of the ferrules, and the projections for urging the leaf springs are formed on the bottom portion of the other member, thereby constituting the plug. When the ferrule abuts against the adapter, the inner member is no longer rotated and only the outer member is rotated, thereby detecting the connecting state of the optical fibers. Therefore, abutment of the ferrules against the adapter and the damage to the ferrules can be prevented. Reliability of optical fiber connections can be improved.

In the above embodiments, receptacles may be used in place of adapters to obtain the same effects as described above.

What is claimed is:

1. A plug of a fiber optic cable connector comprising: a first cylindrical member with a bottom, said first cylindrical member being reciprocated at a predetermined stroke along a ferrule extending in an axial direction; a second cylindrical member with a bottom, said second cylindrical member being reciprocated inside said first cylindrical member and being provided with a hole for receiving said ferrule and device connecting threads; leaf springs each having a surface ascending in a circumferential direction between a bottom portion of said second cylindrical portion and a bottom portion of said first cylindrical portion; and projections for urging said leaf springs, respectively.

2. A plug according to claim 1, wherein said projections are formed on said first cylindrical member and said leaf springs are formed on said second cylindrical member.

3. A plug according to claim 1, wherein an inclined surface is formed on each projection so as to oppose an inclined surface of a corresponding one of said leaf springs.

4. A plug according to claim 1, wherein said projections are integrally formed with said first cylindrical member.

5. A plug according to claim 1, wherein said leaf springs are integrally formed with the second cylindrical member.

6. A plug of a fiber optic cable connector, comprising:

a pin into which an optical fiber is inserted from one end and fixed on an axis, said pin having the other end inserted in an adapter, and a ring stopper and a flange which is spaced by a predetermined distance apart from said ring stopper being mounted on an outer surface at a central portion of said pin, said ring stopper being mounted on a side of said one end and said flange being formed on a side of said other end;

a first cup-shaped member constituted by a first tube portion coaxial with said pin, and a first bottom portion having a first central hole for receiving said pin and located on a side of said ring-like stopper, said first cup-shaped member being rotatable about said pin and movable along an axial direction thereof, said first bottom portion being integrally provided with a plurality of saw-toothed projections on an inner wall surface thereof along a circumferential direction; and a second cup-shaped member constituted by a second tube portion coaxial with said pin and fitted in said first tube portion of said first cup-shaped member, and a second bottom portion having a second central hole for receiving said pin and located on the same side as that of said first bottom portion, said second cup-shaped member being rotatable about said pin and movable along the axial direction thereof, said second bottom portion having an outer surface with a plurality of leaf springs, said leaf springs having surfaces inclined in a circumferential direction so as to oppose inclined surfaces of said saw-toothed projections, said second tube portion having threads on an inner surface so as to engage with said adapter, wherein said first and second bottom portions overlap each other and are clamped between said flange and said ring-like stopper, the predetermined distance between said flange and said ring-like stopper is slightly larger than a sum of a total thickness of said first and second bottom portions and a height of each of said projections, and a maximum height of each of said leaf springs is substantially equal to that of a corresponding one of said projections;

said second member is rotated together with said first member by a force of said projections urging against said leaf springs when said first member is rotated while a resistive force against forward movement of said pin is small; and said projections press said leaf springs, pass beyond distal ends of said leaf springs, and thereafter receive no resistance to rotate only said first member when said first member is rotated while a large resistive force acts on forward movement of said pin and it is difficult to rotate said second member.

* * * * *